United States Patent
Yoshida (10) Patent No.: US 9,227,869 B2
(45) Date of Patent: Jan. 5, 2016

(54) POROUS GLASS BASE MATERIAL MANUFACTURING BURNER AND OPTICAL FIBER POROUS GLASS BASE MATERIAL MANUFACTURING APPARATUS

(71) Applicant: Shin-Etsu Chemical Co., Ltd., Tokyo (JP)

(72) Inventor: Makoto Yoshida, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 47 days.

(21) Appl. No.: 14/178,299

(22) Filed: Feb. 12, 2014

(65) Prior Publication Data
US 2014/0223966 A1  Aug. 14, 2014

(30) Foreign Application Priority Data

Feb. 14, 2013 (JP) .................. 2013-026509
Apr. 8, 2013 (JP) .................. 2013-080175

(51) Int. Cl.
C03B 37/014 (2006.01)
C03B 19/14 (2006.01)

(52) U.S. Cl.
CPC ......... *C03B 37/0142* (2013.01); *C03B 19/1423* (2013.01); *C03B 2207/06* (2013.01); *C03B 2207/12* (2013.01); *C03B 2207/42* (2013.01); *C03B 2207/50* (2013.01); *C03B 2207/52* (2013.01)

(58) Field of Classification Search
USPC .................................... 65/531, 416
IPC ....................... C03B 37/014,37/0142
See application file for complete search history.

(56) References Cited

U.S. PATENT DOCUMENTS

| 4,810,189 | A | 3/1989 | Mikami et al. | |
| 2009/0214998 | A1* | 8/2009 | Yoshida | 431/350 |
| 2011/0259056 | A1* | 10/2011 | Yoshida | 65/416 |

FOREIGN PATENT DOCUMENTS

JP  62-187135 A  8/1987

* cited by examiner

*Primary Examiner* — Mark Halpern (57) ABSTRACT

A porous glass base material manufacturing burner comprising a combustible gas emission nozzle having one or more rows of small-diameter combustion assisting gas emission nozzles arranged around a central glass raw material gas emission nozzle. When a cross section of the burner formed by cleaving in a direction perpendicular to a central axis of the burner is divided into four equal regions by two orthogonal straight lines intersecting at a center of the cross section, total flow path surface area of the small-diameter combustion assisting gas emission nozzles included in two of the four regions through which passes a straight line running along the starting member and through the center of the cross section is less than the total flow path surface area of the small-diameter combustion assisting gas emission nozzles included in the other two of the four regions.

4 Claims, 8 Drawing Sheets

POROUS GLASS BASE MATERIAL MANUFACTURING BURNER AND OPTICAL FIBER POROUS GLASS BASE MATERIAL MANUFACTURING APPARATUS

The contents of the following Japanese patent applications are incorporated herein by reference:
NO.2013-026509 file in Feb. 14, 2013,
NO.2013-080175 file in Apr. 8, 2013.

BACKGROUND

1. Technical Field

The present invention relates to a burner for manufacturing a porous glass base material and a manufacturing apparatus for manufacturing a porous glass base material for optical fiber, in which, according to the optical fiber base material manufacturing method, a porous glass base material is obtained that has a desired density distribution and the yield of the base material is improved.

2. Related Art

A variety of conventional methods have been proposed for manufacturing optical fiber base material. Among these methods, VAD is a commonly known method that includes affixing a starting member to a shaft that rises while rotating, lowering the starting member into a reaction chamber, and using a core deposition burner and cladding deposition burner arranged within the reaction chamber at prescribed angles relative to the axial direction of the starting member to generate and deposit glass fine particles on the tip of the starting member, thereby manufacturing a porous glass base material from a core layer and a cladding layer. With this method, a high production rate cannot be expected, but it is the preferable method for obtaining a desired refractive index distribution.

Figure 1:
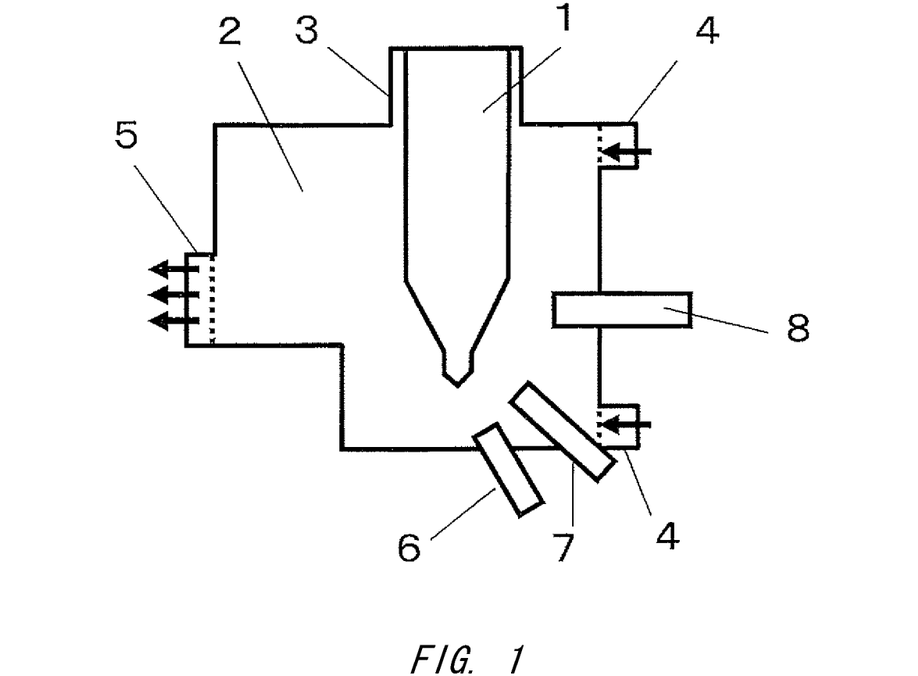
FIG. 1 is a schematic view of an exemplary manufacturing apparatus for manufacturing a porous glass base material for optical fiber using VAD.

FIG. 1 is a schematic view of a manufacturing apparatus for manufacturing a porous glass base material for optical fiber using VAD. The reaction container is formed of a deposition chamber 2, including a gas inlet 4 and an exhaust outlet 5, and a storage chamber 3 that stores the manufactured object, and a plurality of burners are used to synthesize the porous glass base material 1. The starting member is inserted into the deposition chamber 2, and as the starting member is being raised and rotated, the reaction gas is supplied to each burner, hydrolysis occurs in the oxyhydrogen flame, and the synthesized glass fine particles are deposited on the starting member, thereby manufacturing the porous glass base material 1. The burners used here are usually quartz glass burners, and there are a plurality of burners including a core deposition burner 6 arranged pointing at the tip of the starting member and a first cladding deposition burner 7 and second cladding deposition burner 8 that are arranged pointing at the side surface of the starting member. These burners are each arranged at a prescribed angle relative to the axis on which the starting member is pulled up. The manufactured porous glass base material 1 undergoes transparent vitrification in an electric furnace to become a preform for optical fiber.

Figure 2:
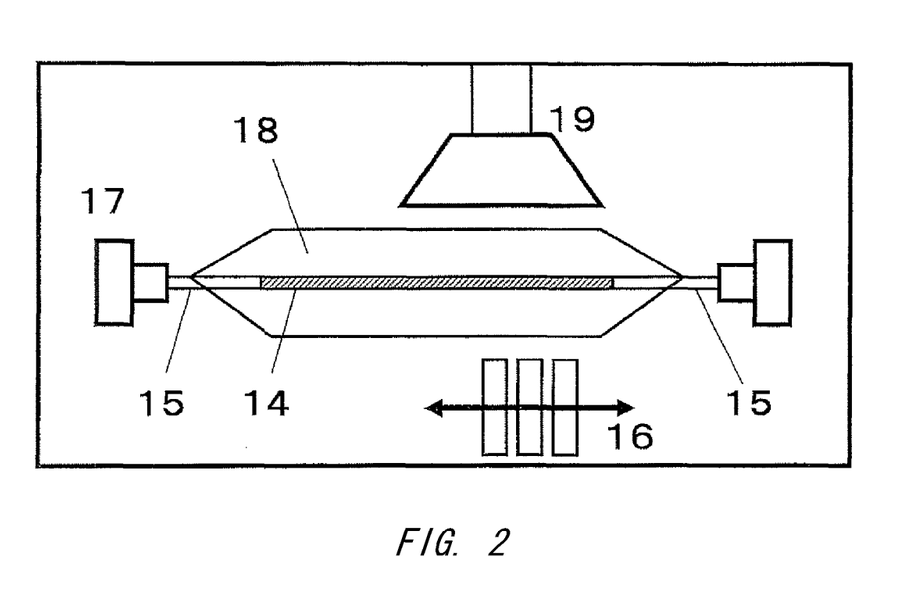
FIG. 2 is a schematic view of an exemplary manufacturing apparatus for manufacturing a porous glass base material for optical fiber using OVD.

A porous glass base material can also be manufactured using OVD. FIG. 2 is a schematic view of a manufacturing apparatus for manufacturing a porous glass base material for optical fiber using OVD. The starting member is formed by fusing the ends of a core rod 14 to dummy rods 15, and the core rod 14 is attached to a rotating chuck 17 via one of the dummy rods 15, to be supported in a manner to be rotatable on the axis thereof. Burners 16 are arranged in series in a manner to be movable left and right, and are pointed at the starting member. Combustible gas, combustion assisting gas, and inert gas are blown along with glass raw material gas ($SiCl_4$) from the burners 16, glass fine particles are synthesized by a hydrolytic reaction in an oxyhydrogen flame, and these glass fine particles are deposited on the starting member, thereby obtaining the porous glass base material 18. Furthermore, a manufacturing apparatus for manufacturing a porous glass base material for optical fiber that uses OVD further includes an exhaust hood 19. With this OVD method, a plurality of burners are lined up in series along the starting member that rotates and is arranged horizontally, and the porous glass base material 18 is manufactured by moving the burners or the starting member relative to each other such that the glass fine particles generated in the flames of the burners are deposited. This method provides a high production rate. The porous glass base material 18 obtained in this manner is passed through a heating furnace formed of a heat resistant material to undergo transparent vitrification, thereby obtaining the optical fiber base material.

In these conventional manufacturing methods, concentric multi-tube burners can be used as the burners for synthesizing the glass fine particles, but burners having this structure cannot sufficiently mix the glass raw material gas, the combustible gas, and the combustion assisting gas, and therefore there is not sufficient generation of the glass fine particles. As a result, the yield cannot be improved and high-speed synthesis is difficult. In order to solve this problem, Japanese Patent No. 1,773,359 proposes a multi-nozzle burner in which small-diameter combustion assisting gas emission nozzles are arranged in a manner to surround a central raw material gas nozzle in a combustible gas emission nozzle.

Figure 3:
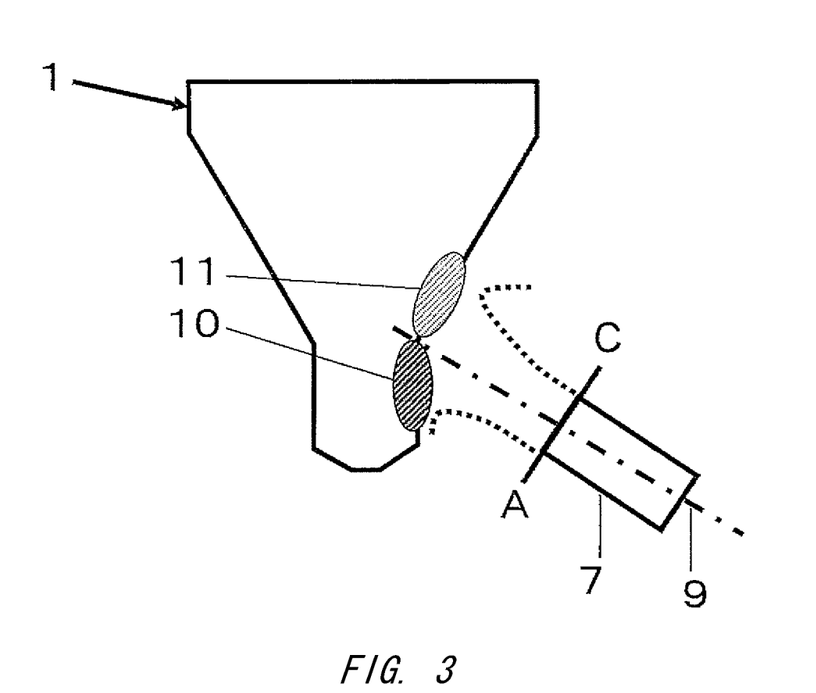
FIG. 3 is a schematic view describing the deposition state caused by the first cladding deposition burner.

In recent years, base material has become larger in an attempt to decrease cost, and this has caused the following problems. With the VAD method shown in FIG. 1, the first cladding deposition burner 7 arranged above the core deposition burner 6 is pointed diagonally upward. Therefore, in the deposition region, as shown in FIG. 3, the deposition density of the bottom side 10 of the flame tends to be high while the deposition density of the top side 11 of the flame tends to be low. The burner central axis 9 is the line through the central axis of the first cladding deposition burner 7.

Here, when the amount of combustible gas supplied to the first cladding deposition burner 7 is increased in order to achieve a suitable density in the top side 11 of the flame, the density of the bottom side 10 of the flame becomes too high and air bubbles remain during the vitrification. On the other hand, when the amount of combustible gas is reduced in order to achieve a suitable density in the bottom side 10 of the flame, the density in the top side 11 of the flame becomes too low and cracking occurs during deposition.

Figure 4:
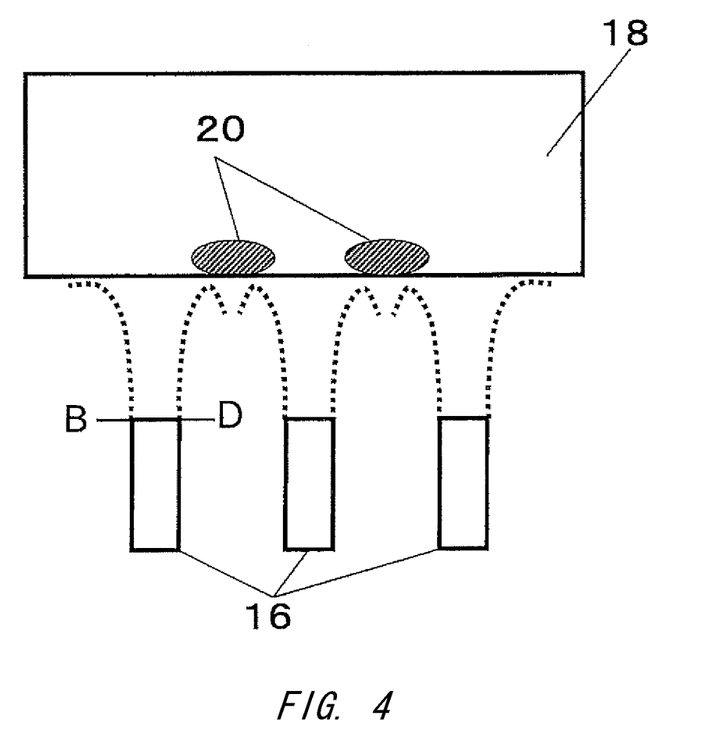
FIG. 4 is a schematic view of deposition using OVD as seen from the front.
Figure 5:
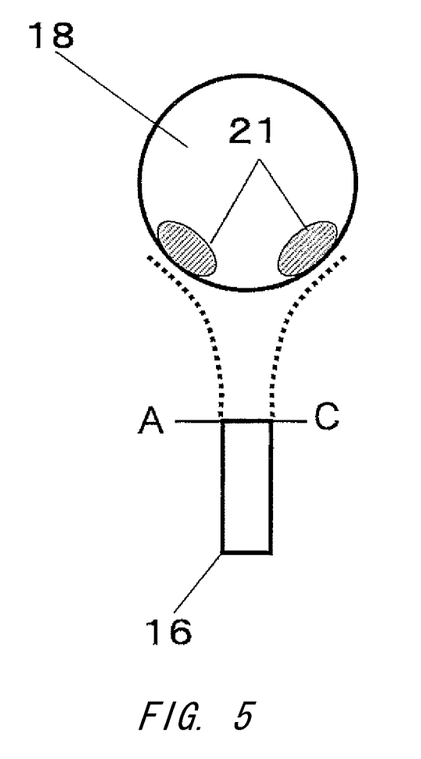
FIG. 5 is a schematic view of deposition using OVD as seen from the side.

When the OVD method is used, the glass fine particles are deposited on the core rod 14 using an apparatus such as shown in FIG. 2, but as shown in FIGS. 4 and 5, the inter-burner regions 20 lined up in series are strongly heated from both sides by the flames of adjacent burners, and therefore the deposition density in these portions tends to be locally increased. As a result, when the amount of combustible gas supplied to the burners is increased in order to realize a suitable overall density for the glass base material 18, the deposition density of the inter-burner regions 20 become locally too high and air bubbles remain during the vitrification. On the other hand, when the amount of combustible gas is reduced in order to realize a suitable deposition density in portions of the inter-burner regions 20, the overall density of the porous glass base material 18 decreases and cracking occurs during deposition.

SUMMARY

It is an objective of the present invention to provide porous glass base material manufacturing burners that, using the OVD method, are capable of realizing a porous glass base material having a desired density distribution and of improving the yield without causing cracking during deposition or allowing air bubbles to remain during the sintering vitrification of the porous glass base material.

According to a first aspect of the present invention, provided is a porous glass base material manufacturing burner comprising a combustible gas emission nozzle having one or more rows of small-diameter combustion assisting gas emission nozzles that are arranged in a concentric circle around a central glass raw material gas emission nozzle and that are formed such that small-diameter combustion assisting gas emission nozzles in the same row have identical focal distances, the porous glass base material manufacturing burner blowing and depositing glass fine particles refined in a flame from below onto a starting member arranged along a horizontal direction. When a cross section of the porous glass base material manufacturing burner, which is formed by cleaving the porous glass base material manufacturing burner in a direction perpendicular to a central axis of the porous glass base material manufacturing burner, is divided into four equal regions by two orthogonal straight lines intersecting each other at a center of the cross section, total flow path surface area of the small-diameter combustion assisting gas emission nozzles included in two of the four regions through which passes a straight line running along the starting member and through the center of the cross section is less than the total flow path surface area of the small-diameter combustion assisting gas emission nozzles included in the other two of the four regions.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 6:
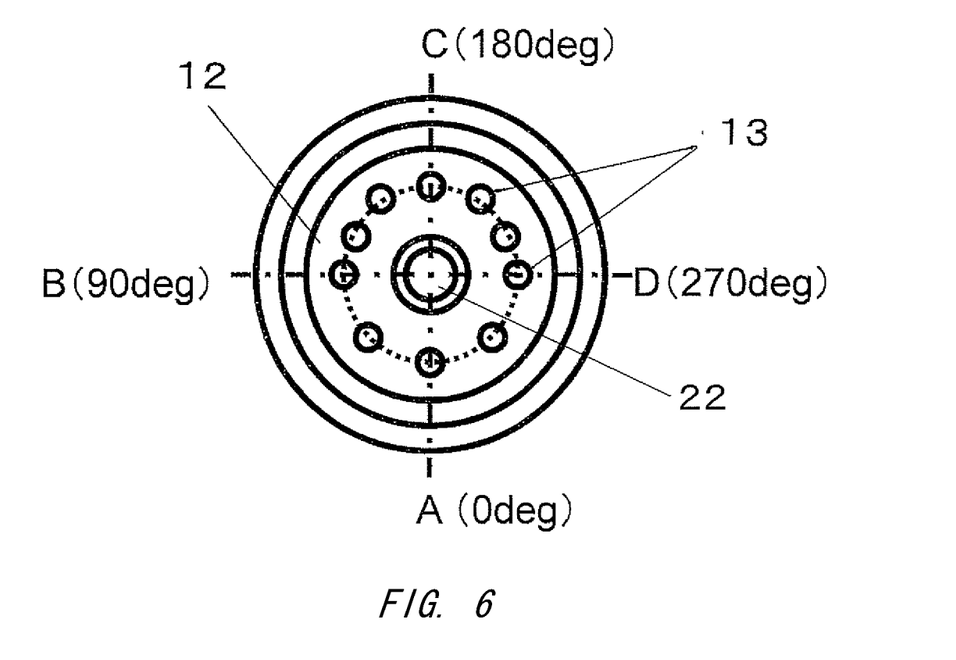
FIG. 6 is a schematic view of an exemplary arrangement of small-diameter combustion assisting gas emission nozzles, suitable for the VAD method.

FIG. 6 is a schematic view of an exemplary arrangement of small-diameter nozzles emitting combustion assisting gas, suitable for the VAD method. As shown in FIG. 6, in the porous glass base material manufacturing burner, the small-diameter combustion assisting gas emission nozzles 13 are arranged within the combustible gas emission nozzle in one or more rows to form a concentric circle around the glass raw material gas emission nozzle, and are not arranged at uniform intervals in the circumferential direction. More specifically, in the region where the deposition density tends to be higher during manufacturing, the small-diameter combustion assisting gas emission nozzles 13 are arranged with low density, i.e. more sparsely, in order to decrease the flame strength, thereby selectively lowering the density. In contrast to this, in the region where the deposition density tends to be lower during manufacturing, the small-diameter combustion assisting gas emission nozzles 13 are arranged with higher density than the small-diameter combustion assisting gas emission nozzles 13 in the low density region in order to increase the flame strength, thereby selectively increasing the density.

In this way, by arranging the small-diameter combustion assisting gas emission nozzles 13 to correct for the deposition characteristics of the manufacturing method, a porous glass base material with more uniform deposition density can be obtained and problems such as air bubbles and cracking are less likely to occur. In particular, when the burners are arranged at a certain angle relative to the growth axis, such as the first cladding deposition burners used in VAD, the density of the bottom side 10 of the flame tends to increase while the density of the top side 11 of the flame tends to decrease, such as shown in FIG. 3. Therefore, the as shown in FIG. 6, the small-diameter combustion assisting gas emission nozzles 13 arranged in the concentric circle are arranged densely in the upper half-circle region, i.e. the position C (180 degrees) side, and arranged sparsely in the lower half-circle region, i.e. the position A (0 degrees) side, thereby effectively decreasing the variation in the deposition density. The position at the bottom of the burner circle is a position A of 0 degrees, and position B at 90 degrees, position C at 180 degrees, and position D at 270 degrees are located at 90 degree clockwise intervals.

Figure 7:
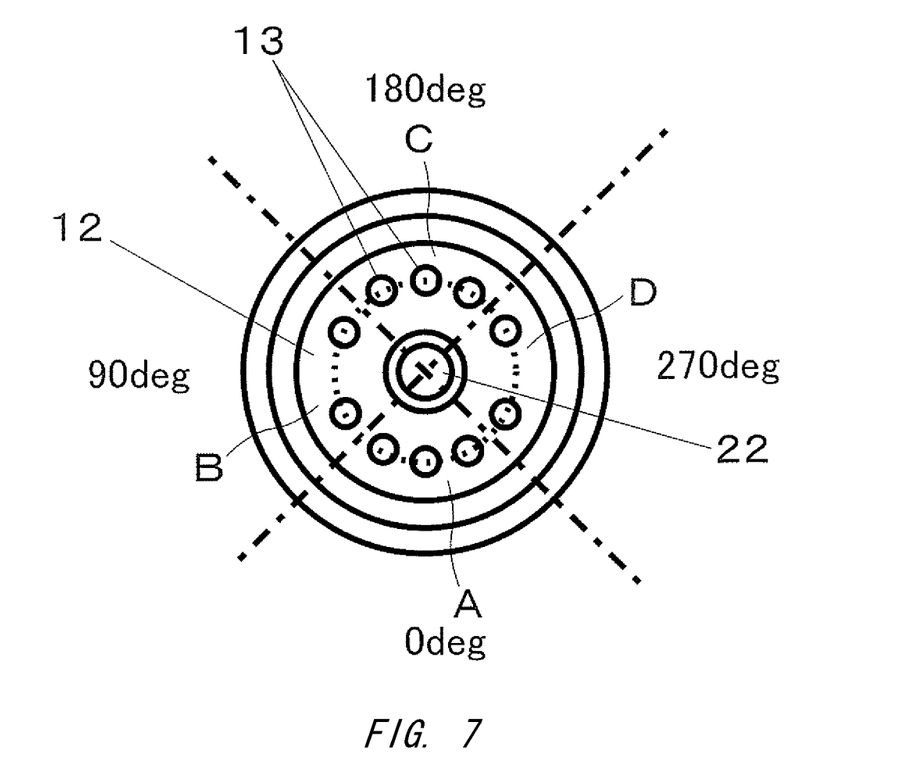
FIG. 7 is a schematic view of an exemplary arrangement of small-diameter combustion assisting gas emission nozzles, suitable for the OVD method.

FIG. 7 is a schematic view of an exemplary arrangement of the small-diameter combustion assisting gas emission nozzles 13 suitable for the OVD method. In the case of OVD, as shown in FIGS. 4 and 5, the effect of the flames of adjacent burners causes the density of the inter-burner regions 20 to increase more easily. The porous glass base material manufacturing burners used in this case include a combustible gas emission nozzle 12 that includes the small-diameter combustion assisting gas emission nozzles 13 on the outside of the central glass raw material gas emission nozzle 22, as shown in FIG. 7, and the small-diameter combustion assisting gas emission nozzles 13 are arranged in rows along a concentric circle around the glass raw material gas emission nozzle 22. The small-diameter combustion assisting gas emission nozzles 13 arranged in a given row all have the same focal distance. The small-diameter combustion assisting gas emission nozzles 13 may be arranged in a plurality of rows along a concentric circle around the glass raw material gas emission nozzle 22.

In the apparatus for manufacturing the porous glass base material for optical fiber using OVD shown in FIG. 2, the porous glass base material manufacturing burners are arranged in a manner to blow and deposit the glass fine particles refined in the flames upward onto the starting member arranged horizontally. In a case where a cross section of a burner for manufacturing the porous glass, taken by cleaving in a direction perpendicular to the central axis of the burner for manufacturing the porous glass, is divided into four equal regions by two orthogonal straight lines through the center of the cross section, the two regions of B on the 90 degree side and D on the 270 degree side are arranged such that a straight line along the horizontal starting member passes therethrough.

Furthermore, the total flow path surface area of the small-diameter combustion assisting gas emission nozzles 13 included in the two regions of B on the 90 degree side and D on the 270 degree side in the porous glass base material manufacturing burner is less than the total flow path surface area of the small-diameter combustion assisting gas emission nozzles 13 included in the two regions of A on the 0 degree side and C on the 180 degree side. In the present embodiment, each small-diameter combustion assisting gas emission nozzle 13 has the same flow path surface area, and therefore the number of small-diameter combustion assisting gas emission nozzles 13 included in the two regions B and D through which passes the straight line along the starting member is less than the number of small-diameter combustion assisting gas emission nozzles 13 included in the other two regions A and C. By arranging the small-diameter combustion assisting gas emission nozzles 13 in the concentric circle such that the small-diameter combustion assisting gas emission nozzles 13 are arranged densely in the top and bottom regions, i.e. the regions A on the 0 degree side and C on the 180 degree side, and sparsely in the right and left regions, i.e. the regions B on the 90 degree side and D on the 270 degree side, the variation in the deposition density can be effectively reduced.

Furthermore, in the apparatus for manufacturing the porous glass base material for optical fiber including the porous glass base material manufacturing burners, as described above, three of the porous glass base material manufacturing burners are arranged below the starting member such that the straight line along the starting member is included in the regions B (90 degrees) and D (270 degrees) of the burners. The starting member, which is arranged horizontally, is moved horizontally while the glass fine particles are deposited thereon. As shown in FIG. 7, in the porous glass base material manufacturing burners, the number of small-diameter combustion assisting gas emission nozzles 13 having the same flow path surface area included in the two regions B and D through which passes the straight line along the starting member is less than the number of small-diameter combustion assisting gas emission nozzles 13 included in the other two regions A and C. Accordingly, instead of emitting a strong flame at the inter-burner regions 20 along the central axis of the starting member such as shown in FIG. 4, the porous glass base material manufacturing burners emit a strong flame at the regions 21 without particularly high density outside the inter-burner region, which are at the outer sides of the central axis of the starting member as shown in FIG. 5.

First Conventional Example

Using VAD, porous glass base material was manufactured using the reaction apparatus shown in FIG. 1. A concentric four-tube burner was used as the core deposition burner 6, and suitable amounts of raw material gas ($SiCl_4$, $GeCl_4$), combustible gas, combustion assisting gas, and inert gas were supplied. For the first cladding deposition burner 7 and the second cladding deposition burner 8, multi-nozzle burners with nozzle focal distances of 100 mm, in which eight small-diameter combustion assisting gas emission nozzles 13 were arranged within the combustible gas emission nozzle 12 shown in FIG. 8 in a concentric circle at uniform intervals, were used. Here, among the raw material gas ($SiCl_4$), combustible gas, combustion assisting gas, and inert gas being supplied from the first cladding deposition burner 7, only the amount of the combustible gas $H_2$ being supplied was changed, as shown in Table 1. Furthermore, suitable amounts of raw material gas ($SiCl_4$), combustible gas, combustion assisting gas, and inert gas were supplied from the second cladding deposition burner 8. The deposition was performed while changing the combustible gas $H_2$ being supplied, according to the four conditions A to D. Deposition was performed for 24 hours. Next, sintering vitrification was performed and ten optical fiber base materials were formed under each condition. The deposition conditions and deposition results are shown together in Table 1. The point at which the lines extending through the flow paths of the small-diameter combustion assisting gas emission nozzles 13 meet at a single point is referred to as the "nozzle focal point," and the distance from the end of the burner in which the nozzles open to this nozzle focal point is referred to as the "focal distance."

TABLE 1

| | | CONVENTIONAL CONDITIONS A | CONVENTIONAL CONDITIONS B | CONVENTIONAL CONDITIONS C | CONVENTIONAL CONDITIONS D |
| --- | --- | --- | --- | --- | --- |
| $SiCl_4$ | L/min | 1.0 | 1.0 | 1.0 | 1.0 |
| Ar | L/min | 1.0 | 1.0 | 1.0 | 1.0 |
| $H_2$ | L/min | 15 | 20 | 25 | 30 |
| $N_2$ | L/min | 4 | 4 | 4 | 4 |
| $O_2$ | L/min | 20 | 20 | 20 | 20 |
| SMALL-DIAMETER $O_2$ | L/min | 5 | 5 | 5 | 5 |
| NUMBER MANUFACTURED | MATERIAL RODS | 10 | 10 | 10 | 10 |
| CRACKING | MATERIAL RODS | 3 | 2 | 0 | 0 |
| AIR BUBBLES | MATERIAL RODS | 0 | 0 | 2 | 6 |

As shown in Table 1, the results show that due to the small amount of combustible gas supplied in the conventional cases A and B, the density in the region on the upper side of the burner flame was too low, and cracking occurred during deposition. On the other hand, due to the large amount of combustible gas supplied in the conventional cases C and D, the density of the region on the upper side of the burner flame was suitable and no cracking occurred during deposition, but when these glass base materials underwent transparent vitrification in an electric furnace, the excessively high density in the region on the bottom side of the flame caused an insufficient amount of gas to escape during vitrification, and air bubbles remained.

First Embodiment

As shown in FIG. 6, a multi-nozzle burner was prepared in which the small-diameter combustion assisting gas emission nozzles 13 are arranged densely in the regions B to D (90 degrees to 270 degrees) centered on the top region C in FIG. 6 and arranged sparsely in the regions D to B (270 degrees to 90 degrees) centered on the bottom region A, which is opposite region C. This burner was arranged under the C side (180 degree side) as the first cladding deposition burner, and deposition was performed. By arranging the burner such that the A side (0 degree side) where there are few of the combustion assisting gas emission nozzles is pointed at the region in the bottom side of the flame where the density increases easily, the density of this region can be decreased. In addition, by arranging the burner such that the C side (180 degree side) where there are many of the combustion assisting gas emission nozzles is pointed at the region in the top side of the flame where the density decreases easily, the density of this region can be increased. As a result, the burner is arranged in a manner to reduce the density distribution within the deposition region. In this way, the glass base material was manufactured using the same conditions as the first conventional example. The deposition conditions and deposition results are shown together in Table 2. As shown in Table 2, under each condition, there were no problems such as cracking during manufacturing or air bubbles remaining in the base material after vitrification.

TABLE 2

|  |  | PRESENT EMBODIMENT CONDITIONS A | PRESENT EMBODIMENT CONDITIONS B | PRESENT EMBODIMENT CONDITIONS C | PRESENT EMBODIMENT CONDITIONS D |
|---|---|---|---|---|---|
| $SiCl_4$ | L/min | 1.0 | 1.0 | 1.0 | 1.0 |
| Ar | L/min | 1.0 | 1.0 | 1.0 | 1.0 |
| $H_2$ | L/min | 15 | 20 | 25 | 30 |
| $N_2$ | L/min | 4 | 4 | 4 | 4 |
| $O_2$ | L/min | 20 | 20 | 20 | 20 |
| SMALL-DIAMETER $O_2$ | L/min | 5 | 5 | 5 | 5 |
| NUMBER MANUFACTURED | MATERIAL RODS | 10 | 10 | 10 | 10 |
| CRACKING | MATERIAL RODS | 0 | 0 | 0 | 0 |
| AIR BUBBLES | MATERIAL RODS | 0 | 0 | 0 | 0 |

Second Conventional Example

Figure 8:
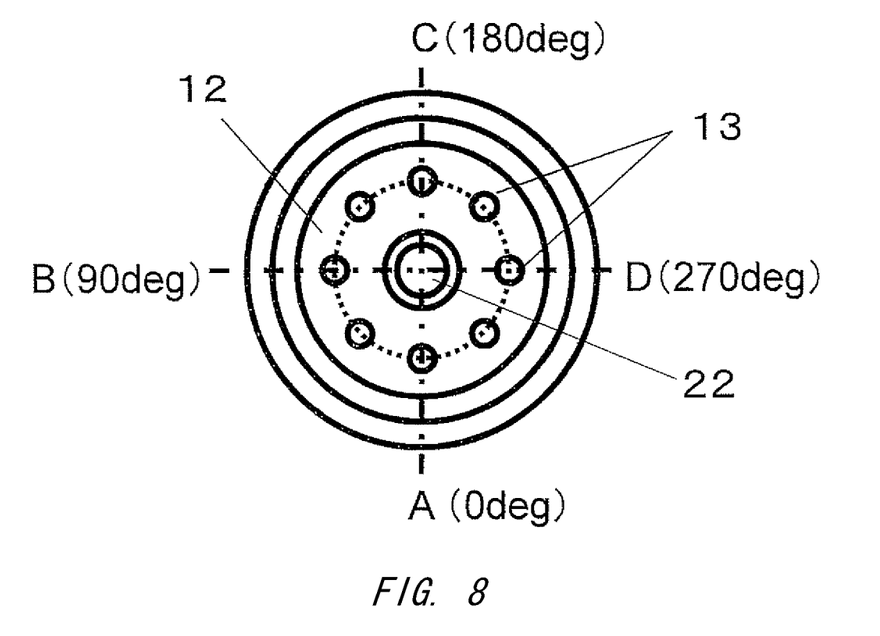
FIG. 8 is a schematic view of a conventional arrangement of small-diameter combustion assisting gas emission nozzles.

Using OVD, porous glass base material was manufactured using the reaction apparatus shown in FIG. 2. Three multi-nozzle burners with nozzle focal distances of 100 mm were prepared, in which eight small-diameter combustion assisting gas emission nozzles 13 were arranged in a concentric circle at uniform intervals within the combustible gas emission nozzle 12, such as shown in FIG. 8. These burners were arranged in a line along the starting member at intervals of 150 mm. These burners were supplied with the suitable gases while changing only the amount of the combustible gas H2, as shown in Table 3, and were used to deposit 100 kg of soot on a starting member formed by fusing the ends of a core rod with an outer diameter of 50 mm and a length of 2000 mm to dummy rods with outer diameters of 50 mm. Next, sintering vitrification was performed and ten optical fiber base materials were formed under each condition. The deposition conditions and deposition results are shown together in Table 3.

TABLE 3

|  |  | CONVENTIONAL CONDITIONS E | CONVENTIONAL CONDITIONS F | CONVENTIONAL CONDITIONS G | CONVENTIONAL CONDITIONS H |
|---|---|---|---|---|---|
| $SiCl_4$ | L/min | 30 | 30 | 30 | 30 |
| $O_2$ | L/min | 3 | 3 | 3 | 3 |
| AIr | L/min | 12 | 12 | 12 | 12 |
| $H_2$ | L/min | 330 | 390 | 450 | 510 |
| $N_2$ | L/min | 12 | 12 | 12 | 12 |
| $O_2$ | L/min | 120 | 120 | 120 | 120 |
| SMALL-DIAMETER $O_2$ | L/min | 75 | 75 | 75 | 75 |
| NUMBER MANUFACTURED | MATERIAL RODS | 10 | 10 | 10 | 10 |
| CRACKING | MATERIAL RODS | 4 | 1 | 0 | 0 |
| AIR BUBBLES | MATERIAL RODS | 0 | 0 | 1 | 3 |

As shown in Table 3, the results show that due to the small amount of combustible gas supplied in the conventional cases E and F, the overall density of the porous glass base material was too low, and cracking began occurring from the ends of the porous glass base material during deposition. On the other hand, due to the large amount of combustible gas supplied in the conventional cases G and H, the overall density of the porous glass base material was suitable, but due to the excessively high density in regions between flames, which correspond to the inter-burner regions 20 in FIG. 4, gas could not escape during the vitrification and remained as air bubbles.

Second Embodiment

As shown in FIG. 7, three multi-nozzle burners were prepared in which the small-diameter combustion assisting gas emission nozzles 13 are arranged densely in the top and bottom regions, i.e. in the regions C on the 180 degree side and A om the 0 degree side, and arranged sparsely in the left and right regions, i.e. in the regions B on the 90 degree side and D om the 270 degree side. These burners were arranged such that the regions B and D pointed toward adjacent burners. This arrangement is used to decrease the density of the inter-burner region 20 where the density increases easily by having the regions B and D where there are few small-diameter combustion assisting gas emission nozzles 13 face this inter-burner region 20 and to increase the density of the region 21 without particularly high density outside the inter-burner region where the density decreases easily by having the regions A and C where there are many small-diameter combustion assisting gas emission nozzles 13 face this region 21 without particularly high density outside the inter-burner region, thereby reducing the density distribution of the deposition region. In this way, manufacturing was performed under the same conditions as in the second conventional example. The results are shown in Table 4. Under each condition, there were no problems such as cracking during manufacturing or air bubbles remaining in the base material after vitrification.

base material and no air bubbles remaining in the base material after the transparent vitrification.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A porous glass base material manufacturing burner comprising
a combustible gas emission nozzle having one or more rows of small-diameter combustion assisting gas emission nozzles that are arranged in a concentric circle around a central glass raw material gas emission nozzle and that are formed such that small-diameter combustion assisting gas emission nozzles in the same row have identical focal distances, the porous glass base material manufacturing burner blowing and depositing glass fine particles refined in a flame from below onto a starting member arranged along a horizontal direction, wherein
when a cross section of the porous glass base material manufacturing burner, which is formed by cleaving the porous glass base material manufacturing burner in a direction perpendicular to a central axis of the porous glass base material manufacturing burner, is divided into

TABLE 4

|  |  | PRESENT EMBODIMENT CONDITIONS E | PRESENT EMBODIMENT CONDITIONS F | PRESENT EMBODIMENT CONDITIONS G | PRESENT EMBODIMENT CONDITIONS H |
|---|---|---|---|---|---|
| $SiCl_4$ | L/min | 30 | 30 | 30 | 30 |
| $O_2$ | L/min | 3 | 3 | 3 | 3 |
| Air | L/min | 12 | 12 | 12 | 12 |
| $H_2$ | L/min | 330 | 390 | 450 | 510 |
| $N_2$ | L/min | 12 | 12 | 12 | 12 |
| $O_2$ | L/min | 120 | 120 | 120 | 120 |
| SMALL-DIAMETER $O_2$ | L/min | 75 | 75 | 75 | 75 |
| NUMBER MANUFACTURED | MATERIAL RODS | 10 | 10 | 10 | 10 |
| CRACKING | MATERIAL RODS | 0 | 0 | 0 | 0 |
| AIR BUBBLES | MATERIAL RODS | 0 | 0 | 0 | 0 |

As described above, by using the porous glass base material manufacturing burner and the porous glass base material manufacturing apparatus of the present invention, it is possible to obtain a porous glass base material with little variation in the density distribution. As a result, advantageous effects are achieved such as being able to improve yield since there is no cracking during manufacturing of the porous glass four equal regions by two orthogonal straight lines intersecting each other at a center of the cross section, total flow path surface area of the small-diameter combustion assisting gas emission nozzles included in two of the four regions through which passes a straight line running along the starting member and through the center of the cross section is less than the total flow path surface area of the small-diameter combustion assisting gas emission nozzles included in the other two of the four regions.

2. The porous glass base material manufacturing burner according to claim 1, wherein
when each of the plurality of small-diameter combustion assisting gas emission nozzles has the same flow path surface area, the number of small-diameter combustion assisting gas emission nozzles included in the two regions through which passes the straight line running along the starting member is less than the number of small-diameter combustion assisting gas emission nozzles included in the other two regions.

3. A manufacturing apparatus for manufacturing a porous glass base material for optical fiber, comprising:
a plurality of porous glass base material manufacturing burners each including a combustible gas emission nozzle having one or more rows of small-diameter combustion assisting gas emission nozzles that are arranged in a concentric circle around a central glass raw material gas emission nozzle and that are formed such that small-diameter combustion assisting gas emission nozzles in the same row have identical focal distances, in order to blow and deposit glass fine particles onto a starting member arranged along a horizontal direction as the starting member is moved in the horizontal direction,
wherein the plurality of porous glass base material manufacturing burners are arranged below the starting member in a direction along the starting member, a cross section of each burner being divided into four equal regions by two orthogonal straight lines intersecting each other at a center of the cross section, and a total flow path surface area of nozzles in two of the four regions through which passes a straight line running through the center of the cross section is less than the total flow path surface area of nozzles in the opposing two of the four regions.

4. The manufacturing apparatus for manufacturing a porous glass base material for optical fiber according to claim 3, wherein
when each of the plurality of small-diameter combustion assisting gas emission nozzles has the same flow path surface area, the number of small-diameter combustion assisting gas emission nozzles included in the two regions through which passes the straight line running along the starting member is less than the number of small-diameter combustion assisting gas emission nozzles included in the other two regions.

\* \* \* \* \*